United States Patent
Yokoyama et al.

(10) Patent No.: US 8,297,396 B2
(45) Date of Patent: Oct. 30, 2012

(54) VEHICLE BODY FRAME STRUCTURE OF SADDLE-RIDING TYPE VEHICLE

(75) Inventors: Takeo Yokoyama, Saitama (JP); Yoshiyuki Kurayoshi, Saitama (JP); Masashi Hagimoto, Saitama (JP); Makoto Oono, Saitama (JP); Makoto Nagayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 12/877,592

(22) Filed: Sep. 8, 2010

(65) Prior Publication Data

US 2011/0073398 A1 Mar. 31, 2011

(30) Foreign Application Priority Data

Sep. 30, 2009 (JP) ................... 2009-227596

(51) Int. Cl.
*B62D 61/02* (2006.01)
*B62K 11/02* (2006.01)

(52) U.S. Cl. ........................................................ 180/219

(58) Field of Classification Search ............... 180/219, 180/227, 228, 229, 230, 231, 225; 280/274, 280/277, 279, 280, 281.1, 282, 283, 284, 280/285, 286
See application file for complete search history.

(56) References Cited

U.S. PATENT DOCUMENTS

| | | | | |
|---|---|---|---|---|
| 4,678,054 A * | 7/1987 | Honda et al. | ............ | 180/225 |
| 4,753,314 A * | 6/1988 | Tsukiji | ............ | 180/227 |
| 5,261,504 A * | 11/1993 | Katsura | ............ | 180/219 |
| 5,284,221 A * | 2/1994 | Warne | ............ | 180/219 |
| 5,375,677 A * | 12/1994 | Yamagiwa et al. | ............ | 180/219 |
| 6,679,347 B2 * | 1/2004 | Iimuro | ............ | 180/219 |
| 6,837,328 B2 * | 1/2005 | Neugebauer et al. | ............ | 180/225 |
| 7,240,755 B2 * | 7/2007 | Iwata et al. | ............ | 180/219 |
| 7,383,909 B2 * | 6/2008 | Kawase | ............ | 180/219 |
| 7,490,689 B2 * | 2/2009 | Seki et al. | ............ | 180/229 |
| 2006/0283650 A1* | 12/2006 | Kawamura et al. | ............ | 180/227 |
| 2009/0194354 A1* | 8/2009 | Kubo et al. | ............ | 180/312 |

FOREIGN PATENT DOCUMENTS

JP 63-38155 Y2 10/1988
JP 2001-71975 A 3/2001

* cited by examiner

*Primary Examiner* — Tashiana Adams
*Assistant Examiner* — Marc Scharich
(74) *Attorney, Agent, or Firm* — Birch, Stewart, Kolasch & Birch, LLP

(57) ABSTRACT

To provide a vehicle body frame structure of a saddle-riding type vehicle that can increase the capacity of an air cleaner and enhance the bending stiffness of the vehicle body frame. The vehicle body frame structure includes a pair of left and right main frames that extend rearwardly from a head pipe, an engine disposed downwardly of the left and right main frames, a fuel tank disposed upwardly of the engine and between the left and right main frames, a pair of left and right engine hangers that extend downwardly from front portions of the left and right main frames and support the engine, and a cross member that connects the left and right engine hangers in a vehicle width direction.

16 Claims, 5 Drawing Sheets

VEHICLE BODY FRAME STRUCTURE OF SADDLE-RIDING TYPE VEHICLE

CROSS-REFERENCE TO RELATED APPLICATIONS

This application claims priority under 35 U.S.C. §119(a) to Application No. 2009-227596, filed in Japan on Sep. 30, 2009, the entirety of which is expressly incorporated herein by reference.

BACKGROUND OF THE INVENTION

1. Field of the Invention

The present invention relates to a vehicle body frame structure of a saddle-riding type vehicle.

2. Description of Background Art

A known structure for a vehicle body frame of a saddle-riding type vehicle includes a front portion frame that is formed from a head pipe, a pair of left and right main frames, a bracket, and a cross member. Specifically, the left and right main frames extend downwardly toward the rear from the head pipe. The bracket connects rear ends of the left and right main frames. The cross member connects front portions of the left and right main frames (See, for example, Japanese Patent Laid-Open No. 2001-71975).

Another known structure for a vehicle body frame of a saddle-riding type vehicle forms the vehicle body frame from a head pipe, left and right lower pipes, left and right rear pipes, left and right upper pipes, an upper connection pipe, and a bracket. Specifically, the left and right lower pipes have front ends welded to the head pipe and rear ends welded to central portions of left and right upper pipes. The left and right rear pipes have front ends welded to rear portions of the left and right lower pipes and rear ends welded to the front portions of rear portions of the left and right upper pipes. The left and right upper pipes have front ends welded to the left and right lower pipes and are connected in a vehicle width direction by three bridge pipes. The upper connection pipe has a front end welded to the head pipe and a rear end welded to a center bridge pipe. The bracket is welded to the rear portions of the left and right lower pipes (See, for example, Japanese Utility Model Publication No. Sho 63-38155).

In the known vehicle body frame structure of the saddle-riding type vehicle disclosed in Japanese Patent Laid-Open No. 2001-71975, the cross member does enhance a bending stiffness of the vehicle body frame; however, because the cross member is disposed across the front portions of the left and right main frames, it is difficult to increase the capacity of an air cleaner.

In the known vehicle body frame structure of the saddle-riding type vehicle disclosed in Japanese Utility Model Publication No. Sho 63-38155, the bridge pipes and the upper connection pipe are disposed on the vehicle body frame. This makes it difficult to increase the capacity of the air cleaner.

SUMMARY OF THE INVENTION

The present invention has been made in view of the foregoing situation and it is an object of the present invention to provide a vehicle body frame structure of a saddle-riding type vehicle that can increase the capacity of the air cleaner and enhance the bending stiffness of the vehicle body frame.

To achieve the foregoing object, according to a first aspect of the present invention, in a vehicle body frame structure for a saddle-riding type vehicle, the vehicle including: a pair of left and right main frames that extend rearwardly from a head pipe; an engine disposed downwardly of the left and right main frames; a fuel tank disposed upwardly of the engine and between the left and right main frames; and a pair of left and right engine hangers that extend downwardly from front portions of the left and right main frames, the engine hangers being configured to support the engine, the vehicle body frame structure has a cross member that connects the left and right engine hangers in a vehicle width direction.

According to a second aspect of the present invention, the cross member is disposed near a connection between the main frames and the engine hangers.

According to a third aspect of the present invention, the main frames include connection holes formed therein, the connection holes being configured to connect intake system ducts; and the cross member is disposed downwardly, or downwardly and rearwardly, of the connection holes.

According to a fourth aspect of the present invention, the cross member is disposed rearwardly of the connection holes and forwardly of a widest distance between the left and right main frames in the vehicle width direction.

According to a fifth aspect of the present invention, the engine hangers include holes formed therein; and the cross member is disposed upwardly, or upwardly and forwardly, of the holes.

According to a sixth aspect of the present invention, the vehicle further includes an intake path that extends from the engine and is connected to an air cleaner disposed upwardly of the engine, the air cleaner having a front portion extended up to a point upward of the cross member.

According to a seventh aspect of the present invention, the cross member is disposed on a level lower than an upper end portion of the engine.

According to the first aspect of the present invention, the vehicle body frame structure includes the left and right main frames that extend rearwardly from the head pipe, the left and right engine hangers that extend downwardly from the front portion of the left and right main frames and support the engine, and the cross member that connects the left and right engine hangers in the vehicle width direction. A space between the left and right main frames can therefore be used to increase capacity of the air cleaner. Additionally, the cross member connects the left and right engine hangers, so that a bending stiffness of the vehicle body frame can be enhanced. This inhibits displacement, in particular, of the left and right main frames in the vehicle width direction during braking of the vehicle, so that a braking feel can be improved.

According to the second aspect of the present invention, the cross member is disposed near the connection between the main frames and the engine hangers. This effectively inhibits displacement of the left and right main frames in the vehicle width direction.

According to the third aspect of the present invention, the main frames include the connection holes formed therein, the connection holes being configured to connect the intake system ducts; and the cross member is disposed downwardly, or downwardly and rearwardly, of the connection holes. Stiffness of the main frames that is reduced by making the connection holes can therefore be effectively enhanced.

According to the fourth aspect of the present invention, the cross member is disposed rearwardly of the connection holes and forwardly of a widest distance between the left and right main frames in the vehicle width direction. The stiffness of the main frames that is reduced by making the connection holes can therefore be effectively enhanced.

According to the fifth aspect of the present invention, the engine hangers include the holes formed therein and the cross member is disposed upwardly, or upwardly and forwardly, of the holes. Stiffness of the engine hangers that is reduced by making the holes can therefore be effectively enhanced.

According to the sixth aspect of the present invention, the intake path that extends from the engine is connected to the air cleaner disposed upwardly of the engine and the air cleaner has the front portion extended up to a point upward of the cross member. The space formed between the left and right main frames by disposing the cross member downwardly can therefore be effectively used, so that the capacity of the air cleaner can be increased.

According to the seventh aspect of the present invention, the cross member is disposed on a level lower than the upper end portion of the engine. The capacity of the air cleaner can therefore be increased by using the space formed between the left and right main frames by disposing the cross member downwardly. In addition, the air cleaner can be disposed downwardly, so that a center of gravity of the vehicle body can be lowered. This allows mass of the vehicle to be centralized. Moreover, vibration of the engine can be inhibited at a position close to the engine hangers, which helps prevent the vibration from being transmitted to the entire vehicle body frame.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
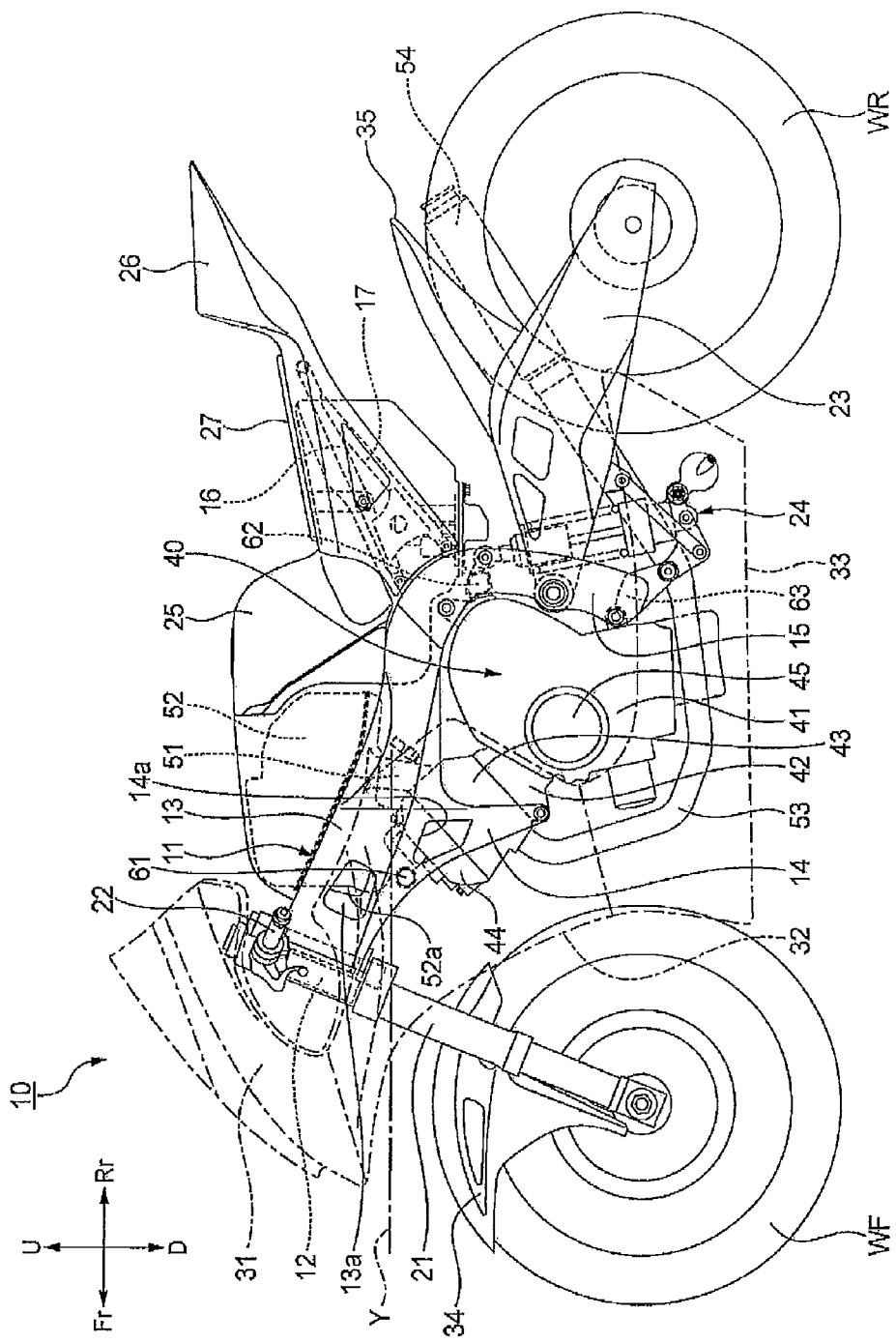
FIG. 1 is a left side elevational view showing a motorcycle in which an embodiment of a vehicle body frame structure of a saddle-riding type vehicle according to the present invention is incorporated.

The present invention will now be described with reference to the accompanying drawings, wherein the same reference numerals have been used to identify the same or similar elements throughout the several views. The drawings should be viewed in the direction of reference numerals. Throughout the descriptions given hereunder, expressions indicating directions including front and rear, right and left, and up and down, mean the same directions as those as viewed from a rider. In the drawings, an arrow Fr indicates forward of the vehicle, an arrow Rr indicates rearward of the vehicle, an arrow L indicates leftward of the vehicle, an arrow R indicates rightward of the vehicle, an arrow U indicates upward of the vehicle, and an arrow D indicates downward of the vehicle.

A motorcycle 10 of a saddle-riding type vehicle according to the embodiment of the present invention includes, as shown in FIG. 1, a vehicle body frame 11 and an engine 40. The vehicle body frame 11 includes a head pipe 12, a pair of left and right main frames 13, a pair of left and right engine hangers 14, a pair of left and right pivot plates 15, a pair of left and right seat rails 16, and a pair of left and right sub-frames 17. Specifically, the head pipe 12 is disposed at a front end of the vehicle body frame 11. The main frames 13 extend rearwardly and downwardly from the head pipe 12. The engine hangers 14 extend downwardly from lower surfaces of front portions of the main frames 13. The pivot plates 15 are connected to, and extend downwardly from, rear end portions of the main frames 13. The seat rails 16 are connected to, and extend rearwardly and upwardly from, upper portions of the pivot plates 15. The sub-frames 17 are connected to, and extend rearwardly and upwardly from, the upper portions of the pivot plates 15. The sub-frames 17 have their rear end portions connected to rear end portions of the seat rails 16. The engine 40 is mounted on the engine hangers 14 and the pivot plates 15 and disposed downwardly of the main frames 13.

In addition to the abovementioned parts, the motorcycle 10 further includes a front fork 21, a front wheel WF, a steering handlebar 22, a swing arm 23, a rear wheel WR, a rear wheel suspension system 24, a fuel tank 25, a seat cowl 26, and a rider's seat 27. Specifically, the front fork 21 is steerably supported by the head pipe 12. The front wheel WF is rotatably supported at a lower end portion of the front fork 21. The handlebar 22 is disposed at an upper end portion of the front fork 21. The swing arm 23 is swingably supported by the pivot plate 15. The rear wheel WR is rotatably supported at a rear end portion of the swing arm 23. The rear wheel suspension system 24 is disposed between the swing arm 23 and the pivot plate 15. The fuel tank 25 is disposed upwardly of the engine 40 and between the pair of left and right main frames 13. The seat cowl 26 is mounted on the pair of left and right seat rails 16. The rider's seat 27 is disposed on the seat cowl 26. Referring to FIG. 1, reference numeral 31 identifies a front cowl; reference numeral 32 identifies a front side cowl; reference numeral 33 identifies an under cowl; reference numeral 34 identifies a front fender; and reference numeral 35 identifies a rear fender.

Referring to FIG. 1, the engine 40 has an outer shell that mainly includes a crankcase 41, a cylinder block 42, a cylinder head 43, a cylinder head cover 44, a generator cover 45, and a clutch cover. Specifically, the cylinder block 42 is disposed at a forward upper end portion of the crankcase 41. The cylinder head 43 is disposed at an upper end portion of the cylinder block 42. The cylinder head cover 44 is disposed at an upper end portion of the cylinder head 43. The generator cover 45 is disposed on a left side surface of the crankcase 41. The clutch cover not shown is disposed on a right side surface of the crankcase 41.

Referring further to FIG. 1, an air cleaner 52 is connected via a throttle body (intake path) 51 to an intake port (not shown) formed at a rear portion of the cylinder head 43. Further, a muffler 54 is connected via an exhaust pipe 53 to an exhaust port (not shown) formed at a front portion of the cylinder head 43.

In accordance with the embodiment of the present invention, referring to FIGS. 2 to 5, the vehicle body frame 11 further includes a first cross member 61, a second cross member 62, a third cross member 63, and a gusset 64. Specifically, the first cross member 61 connects the left and right engine hangers 14 in a vehicle width direction. The second cross member 62 connects the upper portions of the left and right pivot plates 15 in the vehicle width direction. The third cross member 63 connects lower end portions of the left and right pivot plates 15 in the vehicle width direction. The gusset 64 is connected to a rear side of the head pipe 12, insides of front portions of the left and right main frames 13, and insides of front portions of the left and right engine hangers 14 in order to reinforce areas around the head pipe 12.

In the embodiment of the present invention, referring to FIGS. 2 to 5, the first cross member 61 is disposed near a connection 65 between the main frame 13 and the engine hanger 14.

Additionally, in the embodiment of the present invention, referring to FIGS. 2 to 5, each of the left and right main frames 13 includes a connection hole 13a formed at the front portion thereof. The connection hole 13a is an opening to which an intake duct (not shown) for guiding air to the air cleaner 52 is connected. The first cross member 61 is disposed downwardly and rearwardly of the connection holes 13a. Further, the first cross member 61 is disposed rearwardly of the connection holes 13a and forwardly of a vehicle width direction line X (see FIG. 4) that passes through a widest distance between the left and right main frames 13 in the vehicle width direction.

Figure 2:
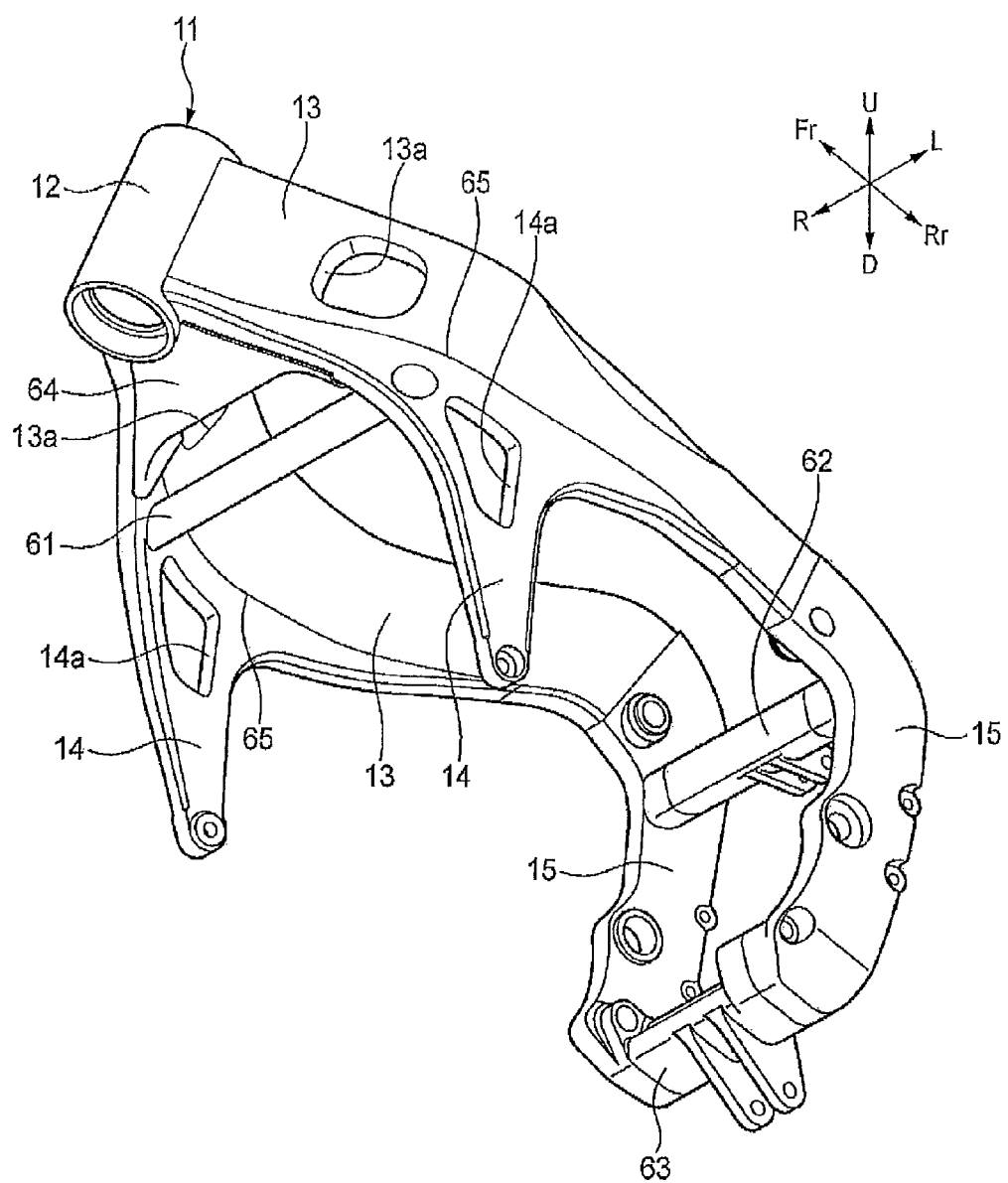
FIG. 2 is a perspective view showing the vehicle body frame shown in FIG. 1 as viewed from forward and downward directions.
Figure 3:
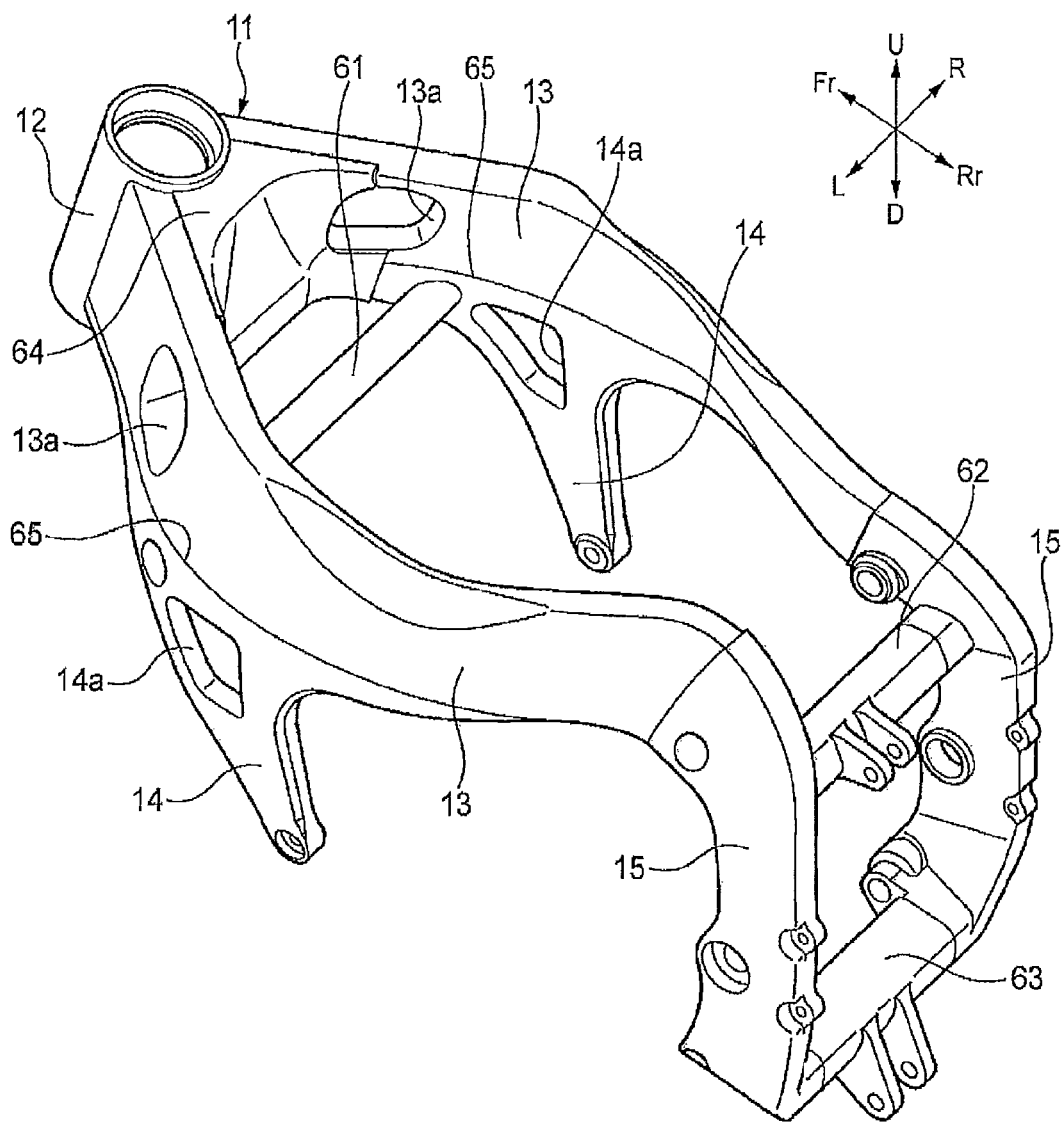
FIG. 3 is a perspective view showing the vehicle body frame shown in FIG. 2 as viewed from rearward and upward directions.
Figure 4:
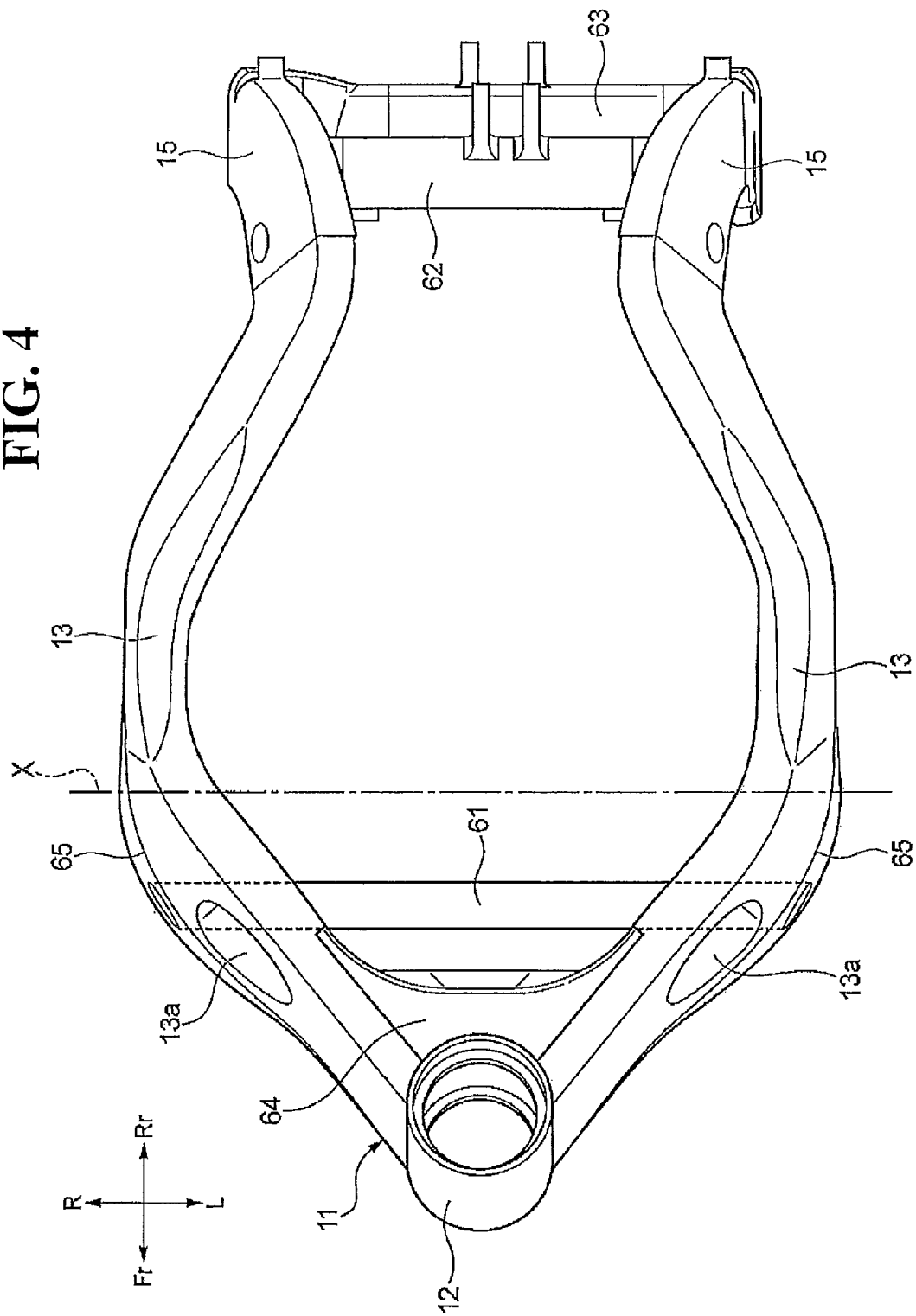
FIG. 4 is a plan view showing the vehicle body frame shown in FIG. 2.
Figure 5:
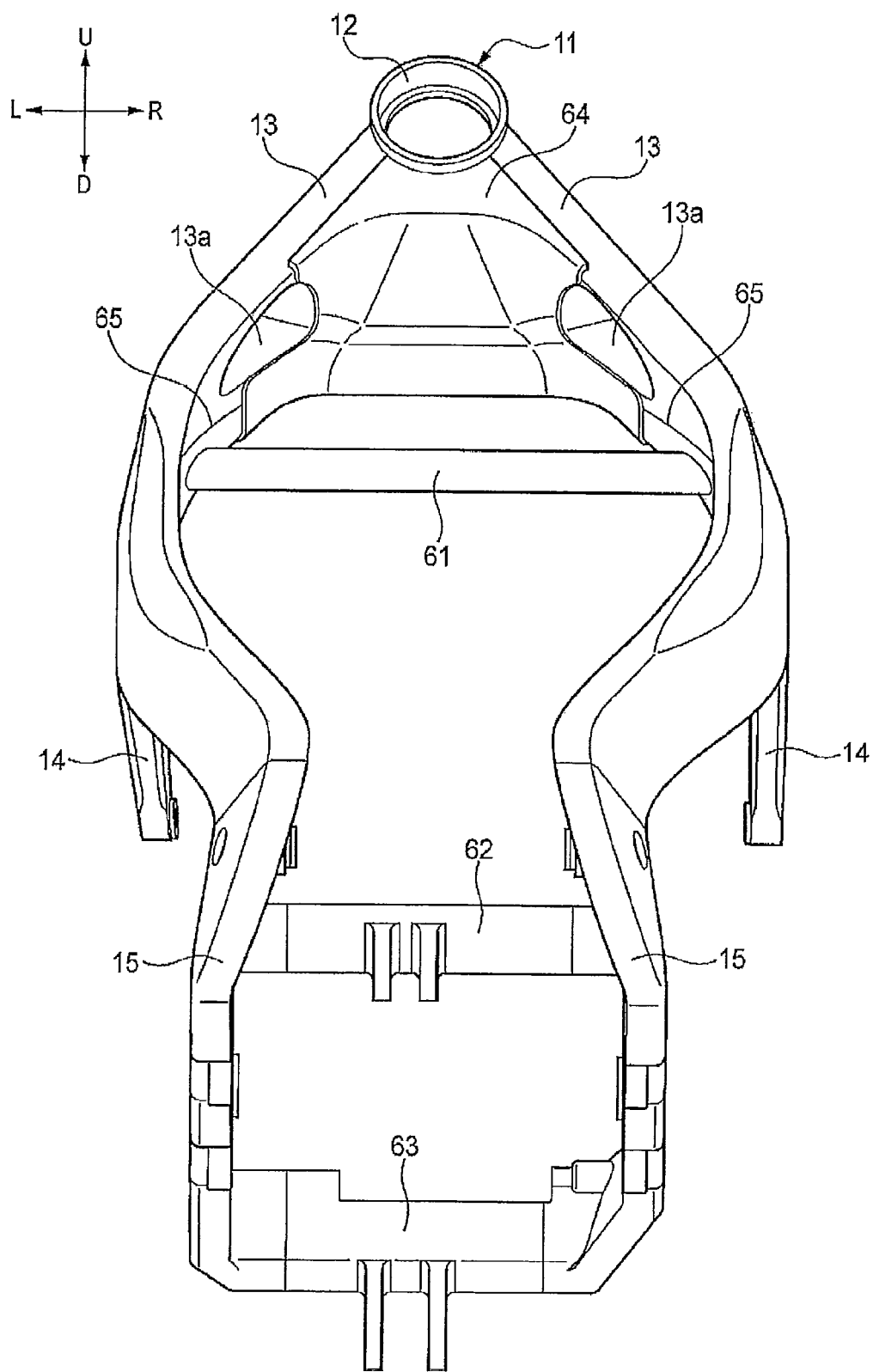
FIG. 5 is a rear elevational view showing the vehicle body frame shown in FIG. 2.

Additionally, in the embodiment of the present invention, referring to FIGS. 2 and 3, each of the left and right engine hangers 14 includes a lightening hole 14a formed at a substantially central portion thereof. The first cross member 61 is disposed upwardly and forwardly of the lightening holes 14a.

Additionally, in the embodiment of the present invention, referring to FIG. 1, the first cross member 61 is disposed on a level lower than a vehicle longitudinal direction line Y that passes by an upper end portion of the cylinder head cover 44 of the engine 40. The air cleaner 52 has a front portion 52a that is formed to extend up to a point upward of the first cross member 61.

As described heretofore, the vehicle body frame structure according to the embodiment of the present invention includes the left and right main frames 13 that extend rearwardly from the head pipe 12, the left and right engine hangers 14 that extend downwardly from the front portion of the left and right main frames 13 and support the engine 40, and the first cross member 61 that connects the left and right engine hangers 14 in the vehicle width direction. A space between the left and right main frames 13 can therefore be used to increase capacity of the air cleaner 52. Additionally, the first cross member 61 connects the left and right engine hangers 14, so that the bending stiffness of the vehicle body frame 11 can be enhanced. This inhibits displacement, in particular, of the left and right main frames 13 in the vehicle width direction during braking of the vehicle, so that a braking feel can be improved.

In the vehicle body frame structure according to the embodiment of the present invention, the first cross member 61 is disposed near the connection 65 between the main frame 13 and the engine hanger 14. This effectively inhibits displacement of the left and right main frames 13 in the vehicle width direction.

In the vehicle body frame structure according to the embodiment of the present invention, the main frames 13 include the connection holes 13a formed therein for connecting the intake ducts and the first cross member 61 is disposed downwardly and rearwardly of the connection holes 13a. Stiffness of the main frames 13 that is reduced by making the connection holes 13a can therefore be effectively enhanced.

In the vehicle body frame structure according to the embodiment of the present invention, the first cross member 61 is disposed rearwardly of the connection holes 13a and forwardly of the vehicle width direction line X that passes through a widest distance between the left and right main frames 13 in the vehicle width direction. The stiffness of the main frames 13 that is reduced by making the connection holes 13a can therefore be effectively enhanced.

In the vehicle body frame structure according to the embodiment of the present invention, the engine hangers 14 include the holes 14a formed therein and the first cross member 61 is disposed upwardly and forwardly of the holes 14a. Stiffness of the engine hangers 14 that is reduced by making the holes 14a can therefore be effectively enhanced.

Additionally, in the vehicle body frame structure according to the embodiment of the present invention, the air cleaner 52 has the front portion 52a that is formed to extend up to a point upward of the first cross member 61. The space formed between the left and right main frames 13 by disposing the first cross member 61 downwardly can therefore be effectively used, so that the capacity of the air cleaner 52 can be increased.

Additionally, in the vehicle body frame structure according to the embodiment of the present invention, the first cross member 61 is disposed on a level lower than the vehicle longitudinal direction line Y that passes by the upper end portion of the cylinder head cover 44 of the engine 40. The capacity of the air cleaner 52 can therefore be increased by using the space formed between the left and right main frames 13 by disposing the first cross member 61 downwardly. In addition, the air cleaner 52 can be disposed downwardly, so that a center of gravity of the vehicle body can be lowered. This allows mass of the motorcycle 10 to be centralized. Moreover, vibration of the engine 40 can be inhibited at a position close to the engine hangers 14, which helps prevent the vibration from being transmitted to the entire vehicle body frame 11.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle body frame structure for a saddle-riding type vehicle, the vehicle including:
   a pair of left and right main frames that extend rearwardly from a head pipe;
   an engine disposed downwardly of the left and right main frames;
   a fuel tank disposed upwardly of the engine and between the left and right main frames; and
   a pair of left and right engine hangers that extend downwardly from front portions of the left and right main frames, the engine hangers being configured to support the engine, the vehicle body frame structure comprising:
   a cross member that connects the left and right engine hangers in a vehicle width direction,
   wherein the main frames include connection holes formed therein, the connection holes being configured to connect with intake system ducts, and the cross member is disposed downwardly, or downwardly and rearwardly, of the connection holes.

2. The vehicle body frame structure according to claim 1, wherein the cross member is disposed rearwardly of the connection holes and forwardly of a widest distance between the left and right main frames in the vehicle width direction.

3. The vehicle body frame structure according to claim 2, wherein the engine hangers include holes formed therein; and the cross member is disposed upwardly, or upwardly and forwardly, of the holes.

4. The vehicle body frame structure according to claim 1, wherein the cross member is disposed near a connection between the main frames and the engine hangers.

5. The vehicle body frame structure according to claim 1, the vehicle further including an intake path that extends from the engine and is connected to an air cleaner disposed upwardly of the engine, the air cleaner having a front portion extended up to a point upward of the cross member.

6. The vehicle body frame structure according to claim 1, wherein the cross member is disposed on a level lower than an upper end portion of the engine.

7. The vehicle body frame structure according to claim 1, wherein the cross member is a first cross member, the vehicle body frame structure further comprising:
 a second cross member, said second cross member connecting upper portions of left and right pivot plates in the vehicle width direction;
 a third cross member, said third cross member connecting lower end portions of the left and right pivot plates in the vehicle width direction; and
 a gusset, said gusset being connected to a rear side of the head pipe, insides of front portions of the pair of left and right main frames, and insides of front portions of the left and right engine hangers in order to reinforce areas around the head pipe.

8. The vehicle body frame structure according to claim 1, wherein the cross member is disposed on a level lower than a vehicle longitudinal direction line that passes by an upper end portion of a cylinder head cover of the engine.

9. A saddle-riding type vehicle, comprising:
 a head pipe;
 a pair of left and right main frames that extend rearwardly from the head pipe;
 an engine disposed downwardly of the left and right main frames;
 a fuel tank disposed upwardly of the engine and between the left and right main frames; and
 a pair of left and right engine hangers that extend downwardly from front portions of the left and right main frames, the engine hangers being configured to support the engine; and
 a cross member that connects the left and right engine hangers in a vehicle width direction,
 wherein the main frames include connection holes formed therein, the connection holes being configured to connect with intake system ducts, and the cross member is disposed downwardly, or downwardly and rearwardly, of the connection holes.

10. The vehicle according to claim 9, wherein the cross member is disposed rearwardly of the connection holes and forwardly of a widest distance between the left and right main frames in the vehicle width direction.

11. The vehicle according to claim 10, wherein the engine hangers include holes formed therein; and the cross member is disposed upwardly, or upwardly and forwardly, of the holes.

12. The vehicle according to claim 9, wherein the cross member is disposed near a connection between the main frames and the engine hangers.

13. The vehicle according to claim 9, further comprising an intake path that extends from the engine and is connected to an air cleaner disposed upwardly of the engine, the air cleaner having a front portion extended up to a point upward of the cross member.

14. The vehicle according to claim 9, wherein the cross member is disposed on a level lower than an upper end portion of the engine.

15. The vehicle according to claim 9, wherein the cross member is a first cross member, the vehicle further comprising:
 a second cross member, said second cross member connecting upper portions of left and right pivot plates in the vehicle width direction;
 a third cross member, said third cross member connecting lower end portions of the left and right pivot plates in the vehicle width direction; and
 a gusset, said gusset being connected to a rear side of the head pipe, insides of front portions of the pair of left and right main frames, and insides of front portions of the left and right engine hangers in order to reinforce areas around the head pipe.

16. The vehicle according to claim 9, wherein the cross member is disposed on a level lower than a vehicle longitudinal direction line that passes by an upper end portion of a cylinder head cover of the engine.

* * * * *